United States Patent [19]
Moon

[11] Patent Number: 5,461,421
[45] Date of Patent: Oct. 24, 1995

[54] ENCODING AND DECODING METHOD AND APPARATUS THEREOF

[75] Inventor: Heon H. Moon, Suwon, Rep. of Korea

[73] Assignee: Samsung Electronics Co., Ltd., Kyungki-Do, Rep. of Korea

[21] Appl. No.: 158,590

[22] Filed: Nov. 29, 1993

[30] Foreign Application Priority Data

Nov. 30, 1992 [KR] Rep. of Korea ............... 92-22906

[51] Int. Cl.⁶ ............................. H04N 7/50
[52] U.S. Cl. ........................ 348/402; 348/699
[58] Field of Search .................. 348/402, 407, 348/413, 416, 699; H04N 7/133, 7/137

[56] References Cited

U.S. PATENT DOCUMENTS 5,093,720  3/1992  Krause ....................... 348/452
5,347,308  9/1994  Wai ........................... 348/394

*Primary Examiner*—Howard W. Britton
*Attorney, Agent, or Firm*—Sughrue, Mion, Zinn, Macpeak & Seas

[57] ABSTRACT

To encode a video signal by means of an interlace scanning method, a mode which generates the minimum number of bits with respect to four modes such as frame/field and inter/intra is selected and the video signal of the selected mode is encoded by adaptive frame/field processing. An encoder includes a direct current differential pulse code modulator for performing a direct current differential pulse code modulation only in the frame intramode and the field intramode among four paths to select a predetermined mode, and another direct current differential pulse code modulator for performing a direct current differential pulse code modulation according to the path of the selected mode by selecting one of the delayed signals after selecting the mode. A decoder has the similar constitution to that of the encoder and properly restores the DC value which is differentially pulse code modulated according to a predetermined mode, thereby decoding the restored signal into an original video signal.

33 Claims, 8 Drawing Sheets

FIG.5
INTRA FRAME
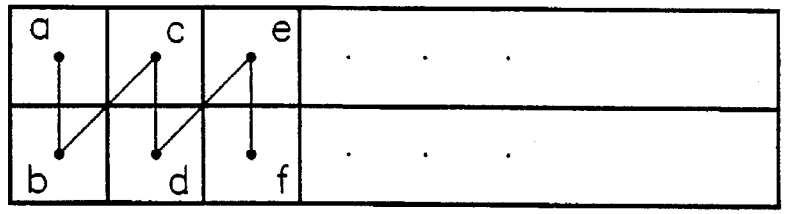
INTRA FIELD
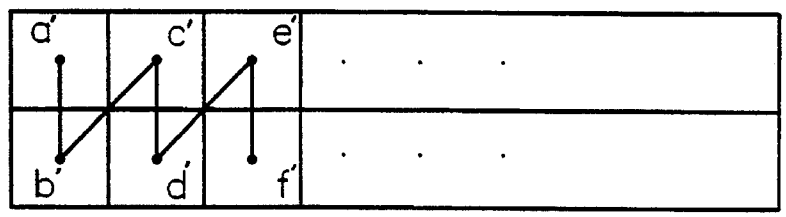
INTER FRAME
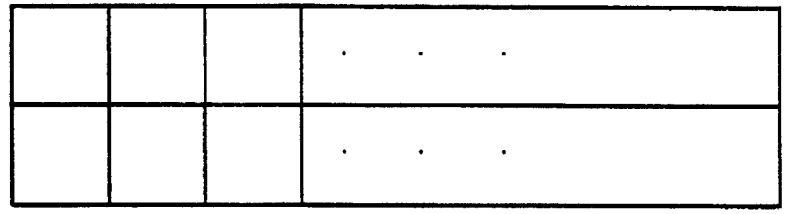
INTER FIELD
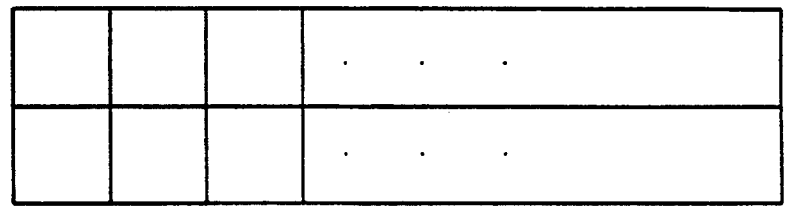

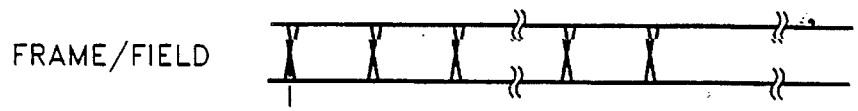
FIG.8A  FRAME/FIELD
FIG.8B  $LAT_S$
FIG.8C  $LAT_{MB}$
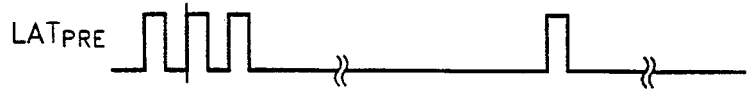
FIG.8D  $LAT_{PRE}$
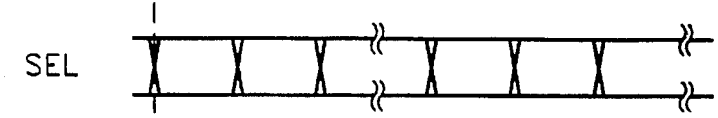
FIG.8E  SEL
FIG.8F  $LAT_B$
FIG.9
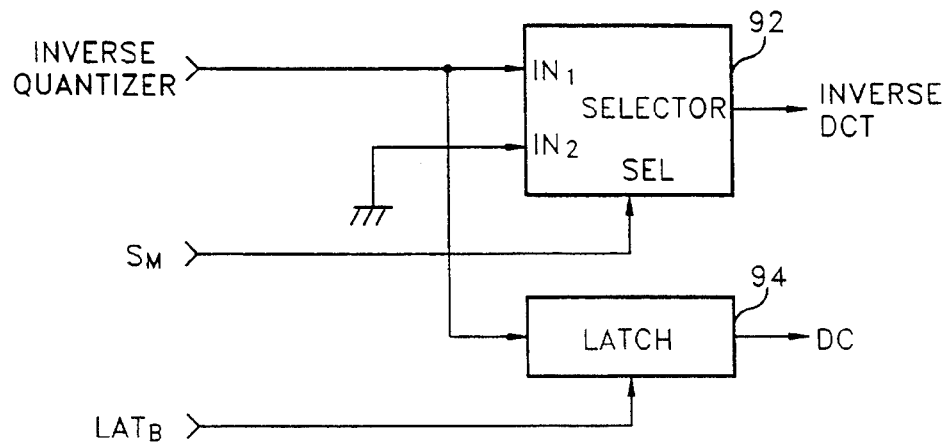

ENCODING AND DECODING METHOD AND APPARATUS THEREOF

BACKGROUND OF THE INVENTION

1. Field of the Invention

The present invention relates to an encoding and decoding method and apparatus thereof for use in a system for transmitting and receiving a video signal, and more particularly to an encoding and decoding method and apparatus thereof for transmitting and receiving data effectively by adaptively processing the data of a frame/field pattern.

2. Description of the Prior Art

Generally, a method that the video data is processed by a differential pulse-code-modulation (DPCM) method and then transmitted, and the received DPCM data is restored, is chiefly used in a digital transmission and reception of a video signal. The DPCM method uses a very high correlation between the pictures of the video data, and encodes difference signals between the frames, thereby obtaining a high data compression ratio. Such a DPCM encoding and decoding method can be used in a high definition television, a digital video tape recorder, a teleconference system, etc.

FIG. 1 illustrates a conventional apparatus for encoding video data. In FIG. 1, video data $V_{IN}$ input in unit of a block having a predetermined magnitude is orthogonally transformed and encoded by a discrete cosine transform (DCT) method in a DCT block 11. The transform coefficient data output from DCT block 11 is quantized by a predetermined quantization level in a quantizer 12. The quantized video data is variable-length-coded according to data distribution probability in a variable-length-coder 13. While the variable-length-coded video data passes through buffer 14, it is outputted as transmission data $V_{CD}$ having a predetermined speed. As described above, the whole frame is encoded by sequentially encoding the input block video data and this coding is called an intramode coding.

On the other hand, the quantized data outputted from quantizer 12 is supplied to an inverse quantizer 15 and is restored to a state prior to being quantized. The transform coefficient data by the inverse-quantization is inversely transformed in an inverse DCT block 16 by an inverse DCT method and restored to a state prior to being transformed by the DCT method. The video data outputted from inverse DCT block 16 is stored in turn in a frame memory 17 via a second adder 20. A motion predictor 18 receives the same video data as that input to a first adder 10, and detects a portion corresponding to the currently input block data among the data of the previous pictures stored in frame memory 17, thereby detecting a corresponding motion vector. The detected motion vector is supplied to motion compensator 19. Then, motion compensator 19 uses the motion vector and extracts the block data which is closest to the currently input block data among the data of the previous pictures stored in frame memory 17. Such block data outputted from motion compensator 19 is supplied to a first adder 10, which calculates the difference component from the currently input block data. The video data corresponding to the difference component is encoded and transmitted. As described above, a mode which encodes the difference signal between the current block data and the motion compensated block data is called intermode.

The video data which is encoded and transmitted as described above is input to a decoder of FIG. 2. Then, encoded video data $V_{CD}$ is decoded through an inverse procedure of the variable-length-coding method in a variable-length-decoder 22 via buffer 21. The data output from variable-length-decoder 22 is inversely quantized as a frequency band transform coefficient in an inverse quantizer 23. An inverse DCT block 24 transforms the frequency band transform coefficient supplied from inverse quantizer 23 into the video data of the spatial region. Here, the inversely transformed video data is reproduction error data corresponding to the error data which is calculated from first adder 10 in the encoder of FIG. 1.

Also, motion vector MV which is calculated and transmitted from motion predictor 18 of the encoder is similarly supplied to motion compensator 26. Motion compensator 26 reads the block data corresponding to motion vector MV from the frame data stored in frame memory 25 and supplies the read data to an adder 27. Then, the inversely transformed error data and the block data supplied from motion compensator 26 is combined in adder 27 and is supplied to a display (not shown).

The encoding procedure as shown in FIG. 1 is performed in unit of a macroblock or a slice having a predetermined magnitude, which is composed of a luminance signal Y and, color difference signals U and V, with respect to 8 blocks of a 8×8 pixel unit as shown in FIG. 3. Also, in such an encoding procedure, the DCPM method is performed with respect to direct current (DC) component data. The DC DCPM method is performed in unit of a macroblock or a slice. To perform the DC DCPM method in unit of a slice not only reduces the reset period but also an amount of the data, compared with the performance of the DC DCPM in unit of a macroblock. The DC DCPM method is preformed only in case that the encoding procedure is an intramode. Here, the intermode and the intramode are determined in unit of a macroblock or a slice.

SUMMARY OF THE INVENTION

Therefore, to solve the above problems, it is an object of the present invention to provide a method for encoding video data by discriminating a field pattern as well as a frame pattern according to a pattern or an amount of picture motion in an apparatus for encoding the video data into an intermode or an intramode as described above.

It is another object of the present invention to provide an apparatus for performing the above-mentioned encoding method.

It is still another object of the present invention to provide a method for decoding encoded video data by adding the transformed data by a DC-DCPM method among the video data encoded as described above to the video data properly restored and encoded according to respective modes.

It is yet another object of the present invention to provide an apparatus for performing the above-mentioned decoding method.

Thus, to accomplish one object of the present invention, there is provided an apparatus for encoding video data by an interlace scanning method, the encoding apparatus comprising: means for arranging input block data having a predetermined magnitude into block data of a frame pattern and a field pattern; first means for receiving the block data of the frame pattern and the block data of the field pattern, discrete-cosine-transforming the respective received data and quantizing the discrete-cosine-transformed data; second means for receiving the block data of the frame pattern, the block data of the field pattern and respective motion compensated data of frame and field patterns, discrete-cosine-transforming the respective received data and quantizing the discrete-cosine-transformed data; means for receiving the quantized block data and selecting a mode according to the number of generated code bits; third means for selecting one among the quantized data according to the mode signal selected in the mode selection means and performing a direct current differential pulse code modulation (DC DPCM) method; means for variable-length-coding the direct current differential pulse code modulated data and outputting the variable-length-coded data; and means for restoring the direct current differential pulse code modulated data.

To accomplish another object of the present invention, there is provided an encoding method for dividing video data by an interlace scanning method into blocks each of which has a predetermined magnitude and encoding the respective divided block data, the encoding method comprising the steps of: discriminatively arranging the block data into block data of a frame pattern and a field pattern; receiving the block data of the frame pattern and the block data of the field pattern, discrete-cosine-transforming the respective received data and quantizing the discrete-cosine-transformed data; receiving the block data of the frame pattern, the block data of the field pattern and motion compensated data, discrete-cosine-transforming the respective received data and quantizing the discrete-cosine-transformed data; accumulatively counting the number of the bits of the block unit according to respective run-length levels which are generated from the quantized data; comparing the count results with one another so as to select a mode which generates a smallest number of the bits; delaying the first and second quantized data by a predetermined time during the mode selection; selectively outputting the delayed quantized data by the predetermined time according to the selected mode signal; performing a direct current (DC) differential pulse code modulation (DPCM) method with the data of the selected mode; and coding the direct current differential pulse code modulated data and restoring the DC differentially pulse code modulated data.

To accomplish still another object of the present invention, there is provided a decoding apparatus for decoding inversely quantized video data into a state prior to being encoded, by using an inverse quantizer for inversely quantizing video data which is divided into blocks each of which has a predetermined magnitude and encoded into an intramode or an intermode according to transmitted quantization level, and motion compensation means, the decoding apparatus comprising: means to which the encoded data is input; direct current (DC) detection means for receiving output data of the inverse quantizer supplied through the input means, a mode selection signal representing the intramode or the intermode and a block DC latch signal representing a block interval of the block data, and detecting DC values of the respective block data; and video restoring means for receiving output data of an inverse discrete cosine transform (DCT) portion which transforms the output data of the inverse quantizer into a state prior to being discrete-cosine-transformed, DC data outputted from the DC detection means, the motion compensated data outputted from the motion compensation means, the mode selection signal and the block DC selection signal, and outputting an original video signal of which the DC level is restored.

To accomplish yet another object of the present invention, there is provided a decoding method for receiving encoded video data and decoding the received encoded video data into an original signal prior to being encoded, the decoding method comprising the steps of: detecting direct current values of respective block data from the received video data; motion-compensating restored block data in correspondance to a motion vector which is calculated from a motion compensator in an encoding apparatus; discriminatively arranging the motion compensated data into frame and field patterns; and receiving the DC data and the motion compensated flame/field patterned data and restoring and outputting an original video signal of which the DC level is restored.

BRIEF DESCRIPTION OF THE DRAWINGS

FIG. 5 is a schematical diagram representing a data processing block options processed by the circuit of FIG. 4.

FIGS. 8A through 8F are operational timing diagrams in the FIG. 7 apparatus.

FIG. 9 is a detailed block diagram of the DC detector of FIGS. 4 and 6.

DETAILED DESCRIPTION OF THE PREFERRED EMBODIMENT

Figure 1:
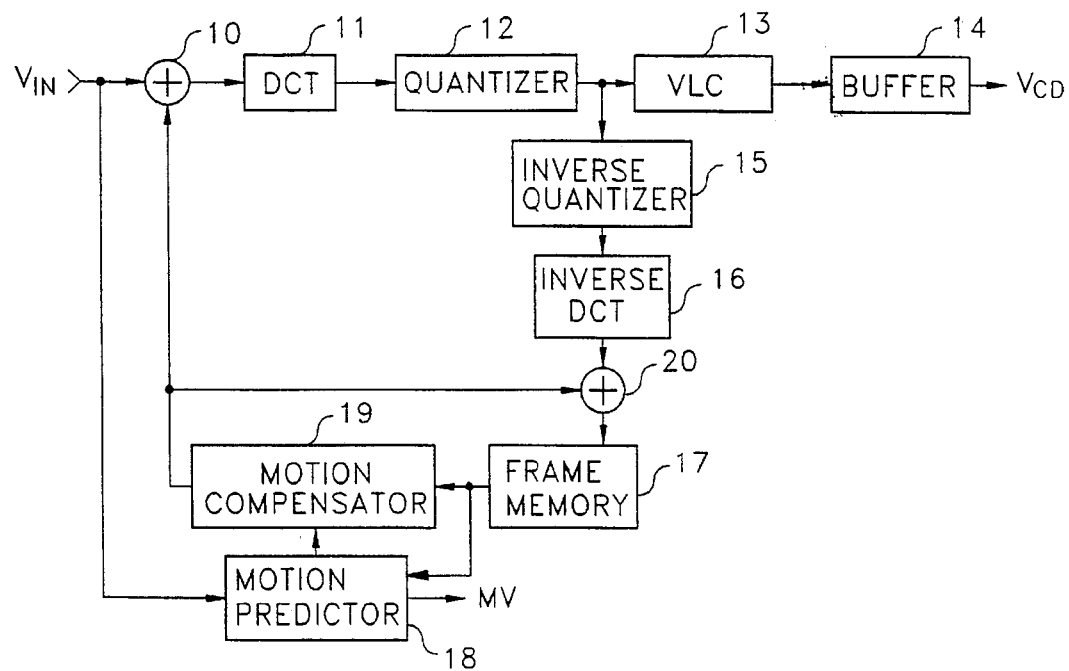
FIG. 1 shows a conventional video data encoding apparatus.
Figure 2:
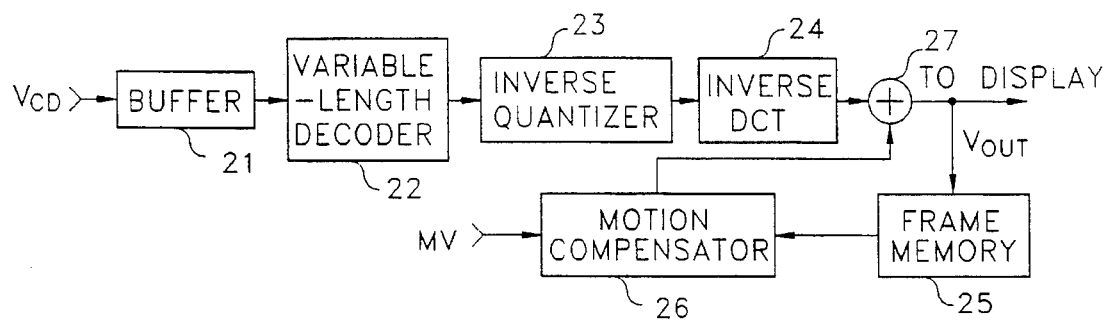
FIG. 2 shows a conventional video data decoding apparatus.
Figure 3:
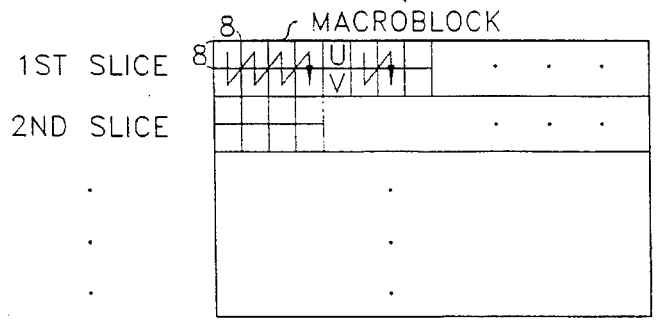
FIG. 3 is a schematical diagram representing a data processing block of FIG. 1.

Preferred embodiments of the present invention will be described below in more detail with reference to the accompanying drawings.

The encoding apparatus of FIG. 4 comprises frame/field arrangers 31 and 32 for arranging the video data of the interlace scanning block data into frame/field pattern block data, DCT portions 33 and 34 for receiving the respective flame/field pattern block data and performing respective discrete-cosine-transforms, DCT portions 39 and 40 for receiving frame/field pattern block data and the motion compensated data and performing respective discrete-cosine-transforms, quantizers 35, 36, 41 and 42 for quantizing the transformed coefficients, DC DPCM portions 37 and 38 for DC differentially pulse code modulating the quantized intramode data, delays 43 and 44 for time-delaying the quantized intermode data during performance of a DC DPCM on the intramode data, a code-length counter 45 for counting the number of the code bits of the run-length level of the block data respectively outputted from DC DPCM portions 37 and 38 and delays 43 and 44, a mode selector 46 for comparing four counted values supplied from code-length counter 45 with one another, and selecting a data processing mode corresponding to a minimum value among the four counted values as a mode for current block data, a third delay 47 for delaying the quantized data of quantizers 35, 36, 41 and 42 for a predetermined time during performing the mode selection, a switching portion SW for selecting one of the output signals of third delay 47 according to selection signal $S_M$ of mode selector 46, a DC DPCM portion 48 for performing a DC DPCM of the output signal of switching portion SW again, a variable-length-coder 49 for variable-length-coding the DC differentially pulse code modulated data and further compressing an amount of the data, an inverse quantizer 51 for inversely quantizing the DC differentially pulse code modulated data, a DC detector 52 for receiving the output data of inverse quantizer 51 and detecting DC component according to mode selection signal $S_M$ of mode selector 46, an inverse DCT portion 53 for inversely transforming the output data of DC detector 52, a video restoring unit 54 for receiving the output data of inverse DCT portion 53 and the DC values of DC detector 52, and restoring the data according to mode selection signal $S_M$ of mode selector 46, a motion predictor 56 and a motion compensator 57 for performing motion prediction and motion compensation from the DC restored picture and a block to be coded, and adders ADD1 and ADD2 for calculating difference signals between the motion compensated block and the current block.

Figure 4A:
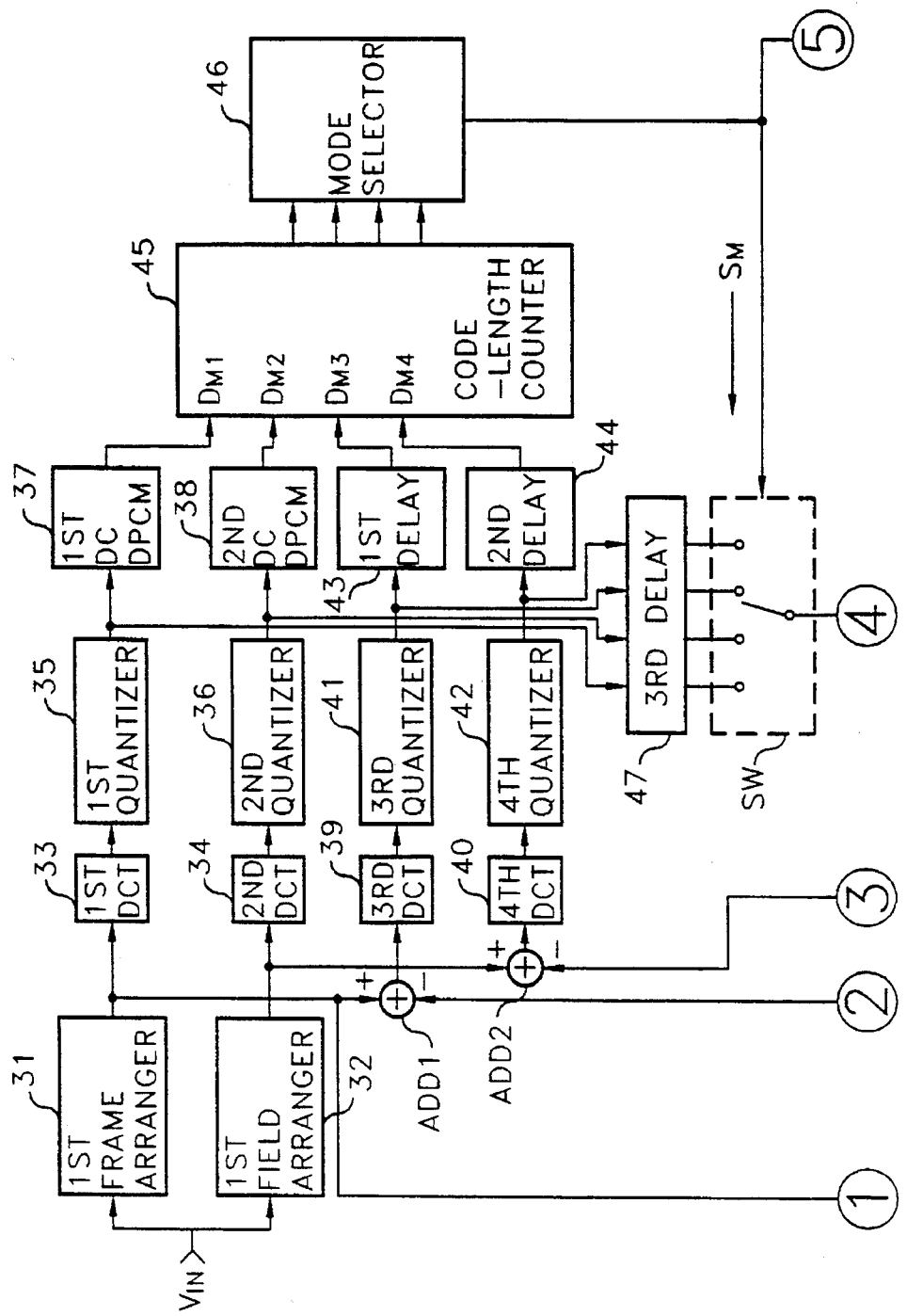
FIGS. 4A and 4B are block diagrams showing a video data encoding apparatus according to one embodiment of the present invention.

In FIG. 4A, block data $V_{IN}$, having a predetermined magnitude of the video signal by the interlace scanning method is sequentially input to a first frame arranger 31 and a first field arranger 32, respectively. The block data is transformed as the respective DCT coefficients in first and second DCT portions 33 and 34. Then, The DCT coefficients are quantized according to a predetermined quantization level in first and second quantizers 35 and 36, respectively. Thereafter, the DC values of the quantized data are differentially pulse-code-modulated in first and second DC DPCM portions 37 and 38, respectively. Also, a predetermined motion compensated block data is subtracted from the block data respectively outputted from first frame arranger 31 and first field arranger 32 in first and second adders ADD1 and ADD2, respectively. Accordingly, the difference components are obtained, respectively. The video data of the difference components is transformed as the DCT coefficients in third and fourth DCT portions 39 and 40. Then, the DCT coefficients are quantized according to a predetermined quantization level in third and fourth quantizers 41 and 42. The data outputted from quantizers 41 and 42 is delayed by a predetermined time, thereby matching temporally the output data of DC DPCM portions 37 and 38.

As described above, the intraframe mode data $D_{M1}$, intrafield mode data $D_{M2}$, interframe mode data $D_{M3}$ and interfield mode data $D_{M4}$ respectively outputted from first and second DC DPCM portions 37 and 38 and first and second delays 43 and 44 are input to code-length-counter 45. Then, code-length-counter 45 accumulatively counts the number of generated bits of block unit according to the run-length level code of the respectively input mode data $D_{M1}$, $D_{M2}$, $D_{M3}$ and $D_{M4}$. Here, the run-length means the number of zeros appearing between the non-zero coefficients, and the level means the absolute value of the non-zero coefficient. Accordingly, the run-length value can be the values of the range between 0 and 63, and the level value is varied according to the number of the values which can be derived from the quantization outputs. Assuming that the quantization output is an integer between −255 and 255, the level value can take the value between 0 and 255 (when the video data has an 8×8 block unit). Here, since the block data is processed in unit of the frame and field patterns, as shown in FIG. 5, code-length-counter 45 counts the number of bits in unit of two blocks with respect to luminance signal Y, while it counts the number of bits in unit of one block with respect to color difference signals U and V, respectively. The respective amount of the generated bits of the intramode block data and the intermode block data $D_{M1}$, $D_{M2}$, $D_{M3}$ and $D_{M4}$ of the frame and field patterns are input to the input terminals of mode selector 46.

Mode selector 46 compares the respective bit generation amount with one another, and selects a mode which generates a smaller number of the bits. However, since the number of bits of two blocks or one block unit should be accumulatively counted to determine a mode, the time delay occurs. Also, since the data of four modes is simultaneously input, that is, as shown in FIG. 5, immediately after the data such as a, a', b and b' enters, the data such as c and c' of the next block enters, the quantized signals are delayed by a predetermined time in third delay 47 during performing the mode selection. Mode selection signal $S_M$ of mode selector 46 is supplied to switch SW. As a result, one among the data of four modes of third delay 47 is selected, thereby performing the DC DPCM again. Here, the DC DPCM portion 48 performs the DC DPCM in order of a,b,c' and d' in a dotted direction in FIG. 5. Also, third DC DPCM portion 48 performs the DC DPCM only when the input data is an intramode. The intermode video data is transmitted to a next block as it is. The data outputted from DC DPCM portion 48 is supplied to a transmission channel via variable-length-coder 49 and buffer 50.

On the other hand, a decoding portion comprises an inverse quantizer 51, a DC detector 52, an inverse DCT portion 53 and a video restoring unit 54, to thereby obtain the motion compensated block data in the course of the DPCM processing. This restored block data is stored in a frame memory 55. Motion predictor 56 predicts a motion from a portion corresponding to the block data currently input to first frame arranger 31 among the data of the previous frame stored in frame memory 55, and detects a motion vector. Motion compensator 57 uses the motion vector and extracts the previous picture block which is the closest to the current block data, so as to be supplied to a second frame arranger 58 and a second field arranger 59, respectively.

The respective motion compensated block data $D_{MC1}$ and $D_{MC2}$ are supplied to first and second adders ADD1 and ADD2, respectively, and simultaneously to a video restoring unit 54.

Figure 6:
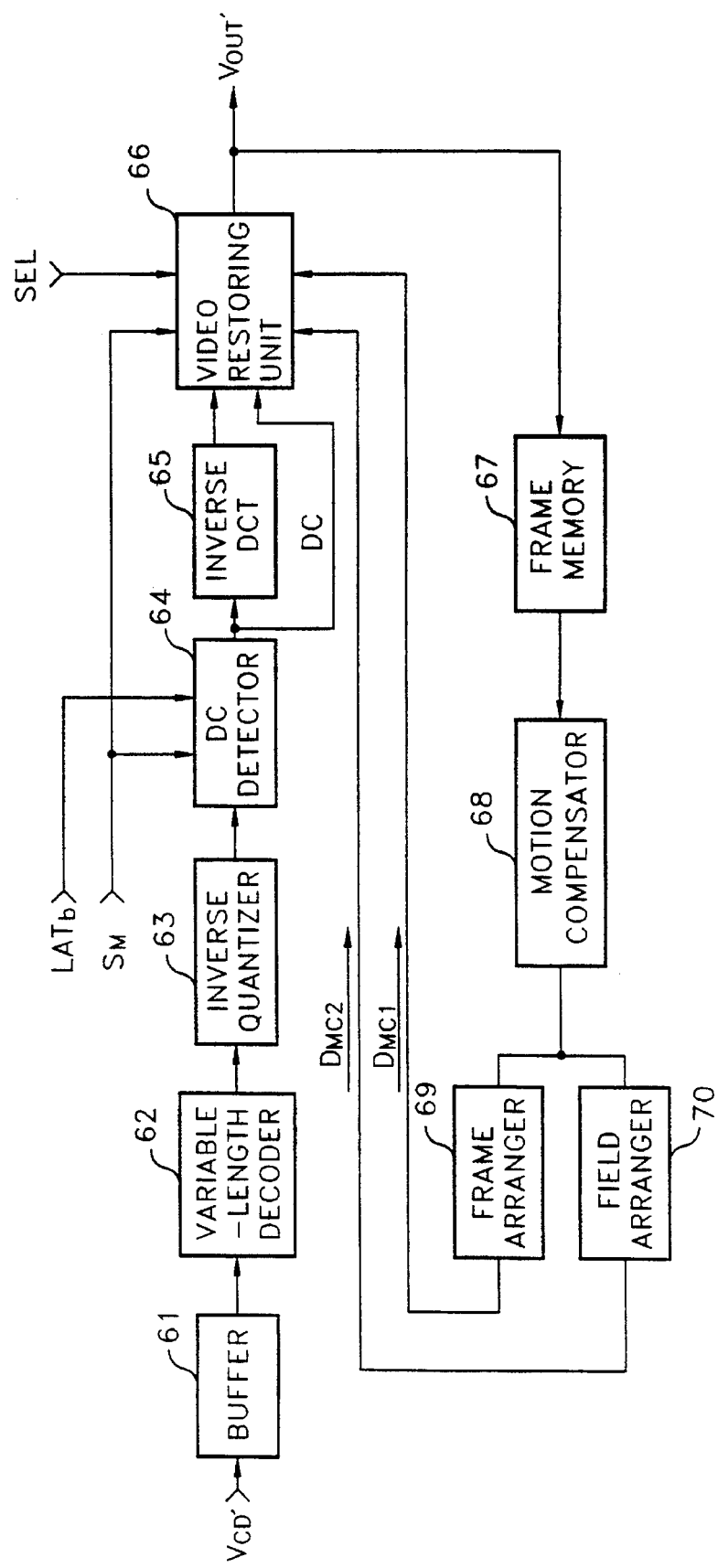
FIG. 6 is a block diagram showing a video data decoding apparatus according to one embodiment of the present invention.

FIG. 6 shows a decoding apparatus according to one embodiment of the present invention. In FIG. 6, the decoding apparatus comprises a buffer 61 which receives block data $V_{CD}$, encoded in the FIG. 4B encoding apparatus, a variable-length-decoder 62 for decoding the output data of buffer 61 into a state prior to being variable-length-coded in the encoding apparatus, an inverse quantizer 63 for decoding the output data of variable-length-decoder 62 into a state prior to being quantized in the encoding apparatus, a DC detector 64 for detecting a DC component from the output data of inverse quantizer 63, an inverse DCT portion 65 for decoding the video data from DC detector 64 into a state prior to being discrete-cosine-transformed in the encoding apparatus, a video restoring unit 66 for receiving the output data of inverse DCT portion 65 and the DC value detected in DC detector 64 and restoring the received data into video data having an average DC level, and a frame memory 67 and a motion compensator 68 for performing motion compensation when the intermode block data is processed in video restoring unit 66. The motion compensated block data outputted from motion compensator 68 is supplied to frame and field arrangers 69 and 70, respectively. Then, frame and field arrangers 69 and 70 supply respective motion compensated data $D_{MC1}$ and $D_{MC2}$ to video restoring unit 66, according to frame and field arrangement.

Figure 4B:
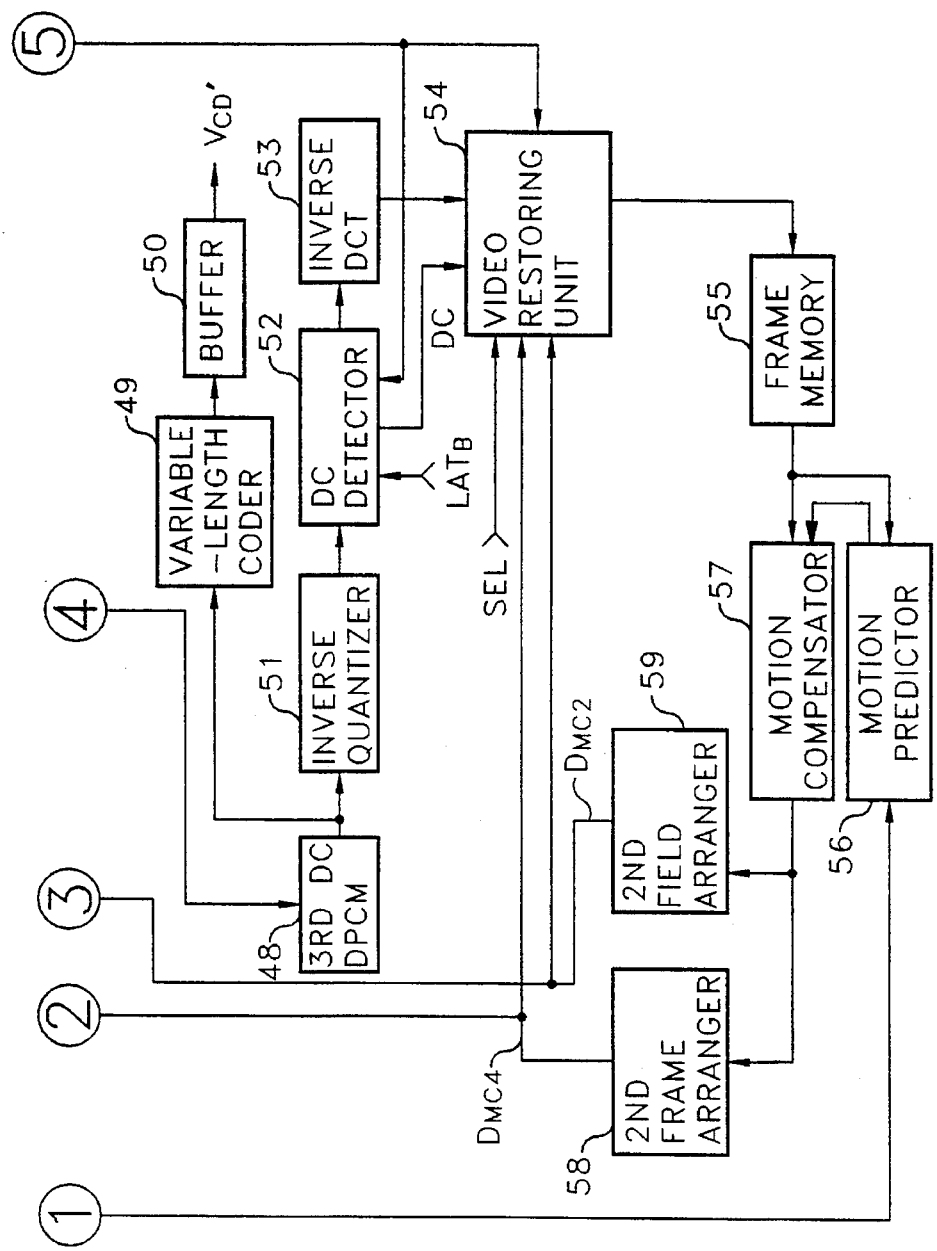
Figure 7:
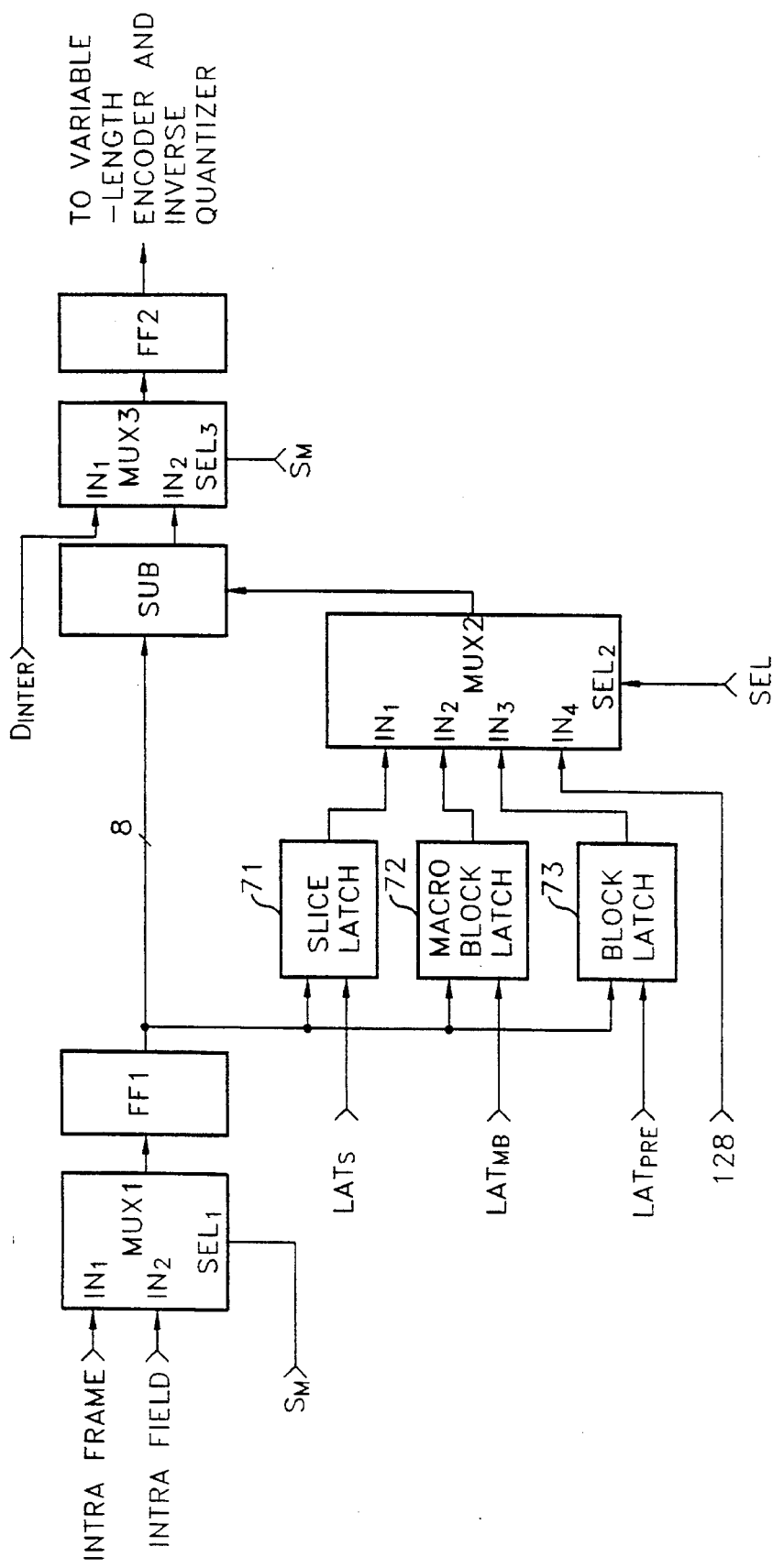
FIG. 7 is a detailed block diagram of a DC DPCM portion in the FIG. 4 apparatus.

FIG. 7 is a detailed block diagram of a DC DPCM portion 48 in the apparatus of FIG. 4B. FIGS. 8A through 8F are operational timing diagrams in the FIG. 7 apparatus.

A first multiplexer MUX1 receives the intramode quantized DCT coefficients which are arranged in unit of a frame/field through data input terminals, and receives frame/field mode selection signal $S_M$ such as that shown in FIG. 8A which is supplied from the FIG. 4A mode selector, through a selection terminal $SEL_1$, thereby selectively outputting the received intramode quantized DCT coefficients. The output data of first multiplexer MUX1 is applied to a first flip-flop FF1 which latches and outputs the DC values of the respective blocks.

A slice latch portion 71 receives the output data of first flip-flop FF1 through a data input terminal and receives a slice DC latch signal $LAT_S$ such as that shown in FIG. 8B through a clock terminal to latch the DC values of the respective slices, thereby latching the DC value of the first block in each slice.

A macroblock latch portion 72 receives the output data of first flip-flop FF1 through a data input terminal and receives a macroblock DC latch signal $LAT_{MB}$ such as that shown in FIG. 8C through a clock terminal to latch the DC values of the respective macroblock, thereby latching the DC value of the eighth block in each macroblock.

A block latch portion 73 receives the output data of first flip-flop FF1 through a data input terminal and receives a previous block DC latch signal $LAT_{PRE}$ such as that shown in FIG. 8D through a clock terminal, thereby outputting a block DC value which has been delayed by a block interval. That is, the block DC value output from first flip-flop FF1 corresponds to the DC value of the previous block. A second multiplexer MUX2 receives the output data of slice latch portion 71 through a first input terminal $IN_1$, receives the output data of macroblock latch portion 72 through second input terminal $IN_2$, receives the output data of block latch portion 73 through third input terminal $IN_3$ and receives a coefficient "128" through fourth input terminal $IN_4$.

Also, second multiplexer MUX2 receives a selection signal SEL such as that shown in FIG. 8E which is supplied from a controller (not shown) through a selection terminal $SEL_2$. Second multiplexer MUX2 selects the data which is input to first through fourth input terminals according to the selection signal, so as to output the selected data through an output terminal. A subtractor SUB subtracts the output data of second multiplexer MUX2 from the output data of first flip-flop FF1, to output the difference value.

When the output data of slice latch portion 71 which is input to first input terminal $IN_1$ of second multiplexer MUX2 by the selection signal is selected and outputted, subtractor SUB is made to output the DC value which is DC differentially pulse-code-modulated with respect to the first block of the slice.

When the output data of macroblock latch portion 72 which is input to second input terminal $IN_2$ of second multiplexer MUX2 by the selection signal is selected and outputted, subtractor SUB is made to subtract the DC value of the eighth block data of the previous macroblock from the DC value of the first block in the macroblock and output the subtraction result, thereby obtaining the DC value which is DC differentially pulse-code-modulated between the macroblocks.

When the output data of block latch portion 73 which is input to third input terminal $IN_3$ of second multiplexer MUX2 by the selection signal is selected and outputted, subtractor SUB is made to subtract the DC value of the previous block data from the DC value of the current block data and output the subtraction result, thereby obtaining the DC values which are DC differentially pulse-code-modulated between the block data.

When the output data of "128" which is input to fourth input terminal $IN_4$ of second multiplexer MUX2 by the selection signal is selected and outputted, subtractor SUB is made to subtract the value of "128" from the DC value of the current block data and output the subtraction result, which corresponds to the function of the DC DPCM when the compulsive intramode data is processed.

When one intermode data $D_{INTER}$ among the frame/field pattern intermode data as a mode data of which the number of the generated bits of the block unit according to the run-length level code is the smallest is selected and switched in switch SW of FIG. 4A, a third multiplexer MUX3 receives the selected intermode data $D_{INTER}$ through a first input terminal $IN_1$, and receives the output data of subtractor SUB through second input terminal $IN_2$.

Also, third multiplexer MUX3 receives a predetermined mode selection signal $S_M$ which is supplied from mode selector 46 in the FIG. 4 apparatus. If selection signal $S_M$ is a signal for selecting an intermode, data $D_{INTER}$ which is input to first input terminal $IN_1$ is selected so as to supply the selected data to a second flip-flop FF2. Otherwise, the data input to second input terminal $IN_2$ is selected so as to be supplied to second flip-flop FF2.

Second flip-flop FF2 delays the input data by a predetermined time, to then supply the delayed data to variable-length coder 49 and inverse quantizer 51, respectively.

FIG. 9 is a detailed block diagram of the DC detectors 52 and 64 of FIGS. 4 and 6. The video data which is inversely quantized in the inverse quantizer 51 is input to a first input terminal $IN_1$ of selector 92, and mode selection signal $S_M$ is input to a selection terminal SEL of selector 92. Here, when the size of the block data is 8×8, the video data which is sequentially supplied to first input terminal $IN_1$ of selector 92 is in unit of 64 sampling data of (0,0),(0,1), . . . ,(7,7). In this case, the DC data occupies a positional value of (0,0) corresponding to the minimum frequency band of each block data. Since mode selection signal $S_M$ which is applied to selection terminal SEL of selector 92 is high in case of the intermode, the output data which is input through first input terminal $IN_1$ of the inverse quantizer is selected so as to be supplied to e.g., inverse DCT portion 65. Also, in case of the intramode, mode selection signal $S_M$ becomes low, the second input terminal $IN_2$ is selected, so that a value of "0" is supplied to inverse DCT portions 53 and 65. On the other hand, latch portion 94 receives the video data of the inverse quantizer through a data input terminal, and receives a block DC latch signal $LAT_B$ such as that shown in FIG. 8F which is a sync signal of the block data through a clock terminal. Then, latch portion 94 latches the DC value corresponding to the position of (0,0) in the input video data by block DC latch signal $LAT_B$. As described above, the DC values of each block data which is obtained in latch portion 94 is supplied to video restoring units 54 and 66.

Figure 10:
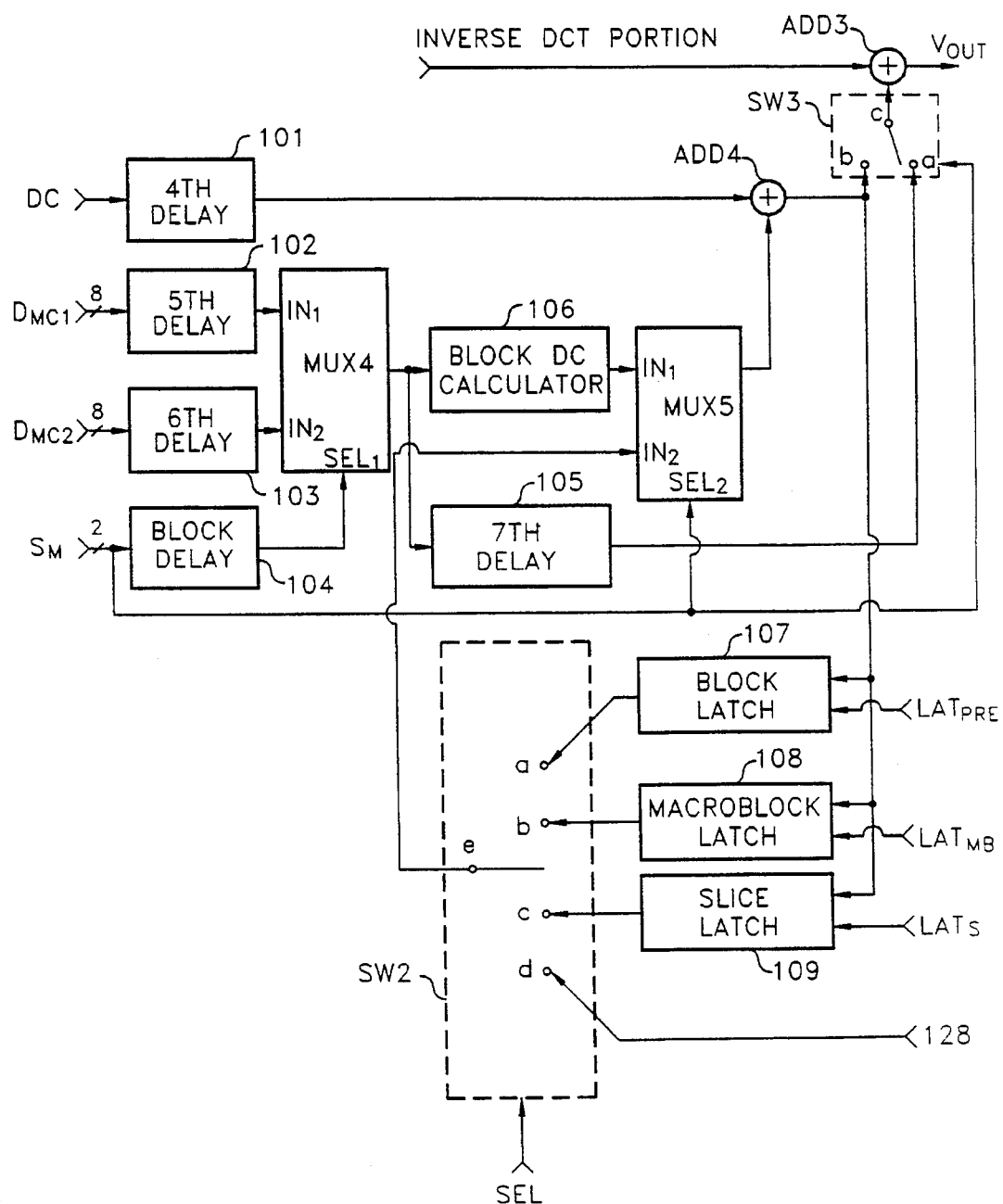
FIG. 10 is a detailed block diagram of the video restoring units in the apparatuses of FIGS. 4 and 6.

FIG. 10 is a detailed block diagram of the video restoring units 54 and 66 in the apparatuses of FIGS. 4 and 6.

In FIG. 10, a fourth delay 101 receives the DC value which is output from the DC detector and delays the received DC value by a predetermined time to match temporally the block data which is output from inverse DCT portions 53 and 65. Fifth and sixth delays 102 and 103 delay motion compensated data $D_{MC1}$ and $D_{MC2}$ which are outputted from frame/field arrangers 58, 59, 69 and 70 by a predetermined time to match temporally the block data output from inverse DCT portions 53 and 65, and supply the delayed data to a fourth multiplexer MUX4. A block delay 104 receives mode selection signal $S_M$ output from the mode selector and delays the mode selection signal by one block interval. Fourth multiplexer MUX4 selectively outputs the output signals of the fifth and sixth delays according to the one-block-delayed frame/field mode selection signal $S_M$. Seventh delay 105 receives motion compensated data which is selectively output from fourth multiplexer MUX4 and the received motion compensated data by a predetermined time.

A block DC calculator 106 receives motion compensated data which is selected in fourth multiplexer MUX4 irrespective of the previous block mode and calculates an average DC values of the input block data. Here, block DC calculator 106 is reset by every block. The average DC value of the intermode block data which is output from block DC calculator 106 is supplied to first input terminal $IN_1$ of a fifth multiplexer MUX5.

Fifth multiplexer MUX5 receives the average DC value of the intermode block data which is output from block DC calculator 106 through first input terminal $IN_1$, and receives a value which is selected by a predetermined selection signal SEL in a second switch SW2 through a second input terminal $IN_2$. Fifth multiplexer MUX5 receives mode selection signal $S_M$ through selection terminal $SEL_2$. Accordingly, when mode selection signal $S_M$ represents an intermode, first input terminal $IN_1$ is selected, while in case of an intramode, second input terminal $IN_2$ is selected. The selected block data is applied to a fourth adder ADD4. Second adder ADD4 adds the DC value which is delayed by a predetermined time through fourth delay 101 to the value selected in fifth multiplexer MUX5.

A second block latch portion 107 receives the restored DC value which is outputted from fourth adder ADD4, through an input terminal and receives previous block latch signal $LAT_{PRE}$ through a clock terminal, to supply the block DC value which is delayed by one block interval to a terminal "a" of second switch SW2.

A second macroblock latch portion 108 receives the output data of fourth adder ADD4 through an input terminal and receives macroblock latch signal $LAT_{MB}$ through a clock terminal, to supply the DC value of the eighth block in the previous macroblock to a terminal "b" of second switch SW2.

A second slice latch portion 109 receives the output data of fourth adder ADD4 through a data input terminal and receives slice latch signal $LAT_S$ through a clock terminal, to latch the DC value of the first block of each slice and to supply the latched DC value to a terminal "c" of second switch SW2.

Second switch SW2 operates by a predetermined selection signal SEL such as that shown in FIG. 8E. This selection signal SEL makes the FIG. 7 apparatus operate to select the DC differentially pulse-code-modulated data.

In other words, the average DC value of the previous block from block latch portion 107 is input to terminal "a" of second switch SW2. The average DC value of the eighth block in the previous macroblock from macroblock latch portion 108 is input to a terminal "b" of second switch SW2. The DC value of the previous slice from slice latch portion 109 is input to a terminal "c" of second switch SW2. Here, an average level value $DC_{ar}$ of the block data is input to a terminal "d" of second switch SW2. The average level value $DC_{ar}$ of the block data is a value which is subtracted from the first data of each slice during performance of the DPCM. In case of the 8-bit data, the average level value $DC_{ar}$ is "128" as its intermediate value. In second switch SW2, terminals "c" and "d" are connected to each other selected only at the interval of the first start data of each slice.

A third switch SW3 receives motion compensated data output from seventh delay 105 through terminal "a" and receives the restored DC value output from fourth adder ADD4 through terminal "b." Then, third switch SW3 receives the mode selection signal $S_M$ as a control signal and performs a switching operation.

A third adder ADD3 adds the output data of inverse DCT portion 53 or 65 to the DC value selected in third switch SW3, to transmit the selected DC value frame memories 55 and 67 and a display (not shown).

When explaining the operation of the FIG. 10 apparatus, it is assumed that the current block data supplied from inverse DCT portion 53 or 65 is an intermode. In third switch SW3, terminals "c" and "a" are connected to each other by intermode selection signal $S_M$. The block data outputted from inverse DCT portion 53 or 65 is supplied to a third adder ADD3. Motion compensated data $D_{MC1}$ or $D_{MC2}$ selectively outputted from fourth multiplexer MUX4 is supplied to third adder ADD3 via third switch SW3. Then, third adder ADD3 adds the inversely discrete-cosine-transformed block data to the motion compensated data, to output restored video data $V_{OUT}$.

Also, fourth adder ADD4 adds the detected DC value of the intermode block data which is delayed by a predetermined time in fourth delay 101 to the average DC value of the block data which is output from fifth multiplexer MUX5 which receives intermode selection signal $S_M$. The DC value of the intermode block outputted from fourth adder ADD4 is applied to terminal "b" of third switch SW3 and simultaneously to block latch portion 107, macroblock latch portion 108 and slice latch portion 109.

On the other hand, when the current block data is the intramode, terminals "c" and "b" are connected to each other by the intramode signal in third switch SW3. Fourth adder ADD4 adds the DC detection value of the current intramode block to the output value of second switch SW2 which is input through fifth multiplexer MUX5. Second switch SW2 performs a switching operation by a selection signal SEL such as that shown in FIG. 8E which is supplied from a controller (not shown). The output data of fourth adder ADD4 is applied to terminal "b" of third switch SW3. As the current block is the intramode, third adder ADD3 adds the intramode block data which is supplied after being inversely discrete cosine transformed in inverse DCT portion 53 or 65 to the DC value supplied from third switch SW3, thereby outputting video data $V_{OUT}$ of which the DC level is restored.

As described above, the DC restoring method is determined by the current mode irrespective of the previous mode.

As described above, the DC DPCM system and the restoring apparatus adapted in the present invention perform the DC DPCM at the respective modes before selecting the frame/field and intermode/intramode for the motion compensation DCT encoder by the adaptive frame/field processing, and performs the DC DPCM again according to a selected mode after selecting the frame/field and intermode/intramode. The restoring of the DC components is performed in the encoder and the decoder in an independent manner, thereby minimizing the restoring error.

What is claimed is:

1. An encoding apparatus for video data producing an interlace scanning method comprising:

means for arranging input block data having a predetermined magnitude into block data of a frame pattern and a field pattern;

first means receiving the block data of the frame pattern and the block data of the field pattern, for discrete-cosine-transforming the respective received data and for quantizing the discrete-cosine-transformed data to produce first and second data;

second means receiving the block data of the frame pattern, the block data of the field pattern and respective motion compensated data of frame and field patterns, for discrete-cosine-transforming the respective received data and for quantizing the discrete-cosine-transformed data to produce third and fourth data;

means for receiving the quantized block first through fourth data and selecting a mode according to the number of generated corresponding code bits;

third means for selecting any one among the quantized first through fourth data according to the mode signal selected in the mode selection means and for performing a direct current differential pulse code modulation (DC DPCM) operation, means for variable-length-coding the direct current differential pulse code modulated data and outputting the variable-length-coded data; and means for restoring the direct current differential pulse code modulated data.

2. An encoder apparatus according to claim 1, wherein said third means comprises:

means for dividing intramode data representing the frame/field arrangement into a plurality of slices and differentially pulse code modulating respective DC value of the previous slice at a first block of each slice;

means for dividing a present slice into a plurality of macroblocks and differentially pulse code modulating the DC value of the previous macroblock at the first block of each macroblock;

means for differentially pulse code modulating the DC value between the block data in the slices; and means for differentially pulse code modulating a difference value between the first block data of each slice and a "128" coefficient corresponding to average DC value of the block data when said slices are encoded and transmitted during intramode processing.

3. An encoder apparatus according to claim 1, further comprising motion compensation means for discriminatively arranging the motion compensated data representing a frame/field pattern, and supplying the discriminatively arranged frame/field pattern motion compensated data to means for adding and said data restoring means.

4. An encoding apparatus according to claim 1, further comprising adder means receiving the frame/field pattern block data and the motion compensated frame/field pattern block data for calculating a difference signal between two data only, and for supplying the calculated difference signal to said second means.

5. An encoder apparatus according to claim 4, further comprising motion compensation means for discriminatively arranging the motion compensated data representing a frame/field pattern, and for supplying the discriminatively arranged frame/field pattern motion compensated data to said adder means and said data restoring means.

6. An encoding apparatus according to claim 1, wherein said mode selection means comprises:

fourth means receiving the first and second data of the quantized frame/field patterns from said first means for performing a direct current differential pulse code modulation (DC DPCM);

delay means for delaying the output third and fourth data of said second means by a predetermined time to temporarily match the output data after performing the DC DPCM;

means for accumulatively counting the number of generated said code bits of the block unit according to the respective run-length levels from the block data provided by the DC DPCM and the delayed block data; and means for selecting a mode corresponding to the smallest number of the code bits by comparing bit generation amounts.

7. An encoder apparatus according to claim 6, wherein said mode selection signal is composed of at least 2-bit information.

8. An encoder apparatus according to claim 1, wherein said data restoring means comprises:

an inverse quantizer receiving the output data of said third means for restoring the received data into a state prior to being quantized;

a DC detector for receiving said inverse quantizer output data and detecting the DC value of each block data;

an inverse DCT portion receiving said DC detector output data for restoring a state prior to being discrete cosine transformed; and a video restoring unit for receiving said DC detector output data and said inverse DCT portion output data and restoring the received data into the original video data.

9. An encoder apparatus according to claim 8, wherein said video restoring unit further comprises:

a block delay for delaying the mode selection signal by one block interval;

means for delaying a motion compensated data representative of said second means output and arranged in a respective frame/field pattern so as to temporally synchronize said inverse DCT portion output data;

a block DC calculator receiving delayed frame/field arranged motion compensated data for calculating an average DC value of each block data;

means for receiving said DC detector output data and said average DC value for outputting a restored DC value for each block data; and adder means for selectively adding said motion compensator or the restored DC value to said inverse DCT portion output data according to the mode selection signal.

10. An encoder apparatus according to claim 9, further comprising a multiplexer connected to an input terminal of said block DC calculator for selectively outputting the delayed frame/field arranged motion compensated data according to the delayed mode selection signal supplied from said block delay.

11. An encoder apparatus according to claim 9, wherein said adder means further comprises:

a second switch having a first input terminal to which the motion compensated block data is applied, and a second input terminal to which the restored DC value is applied, selectively outputting the respective data input through said first and second input terminals according to the mode selection signal; and a second adder for adding said inverse DCT portion output data to the second switch output data.

12. An encoder apparatus according to claim 9, wherein said adder means adds said inverse DCT portion output data to the motion compensated block data output from said motion compensator and outputs the added result when the supplied mode selection signal corresponds to intermode processing, while said adder means adds the block data output from said inverse DCT portion to the restored DC value and outputs the added result when the supplied mode selection signal corresponds to intramode processing.

13. An encoder apparatus according to claim 12, wherein said adder means further comprises:

a second switch having a first input terminal to which the motion compensated block data is applied, and a second input terminal to which the restored DC value is applied, and for selectively outputting the respective data input through said first and second input terminals according to the mode selection signal; and a second adder for adding said inverse DCT portion output data to said second switch output data.

14. An encoder apparatus according to claim 9, further comprising a first delay portion for delaying output from said DC detector by a predetermined time so as to temporally synchronize said inverse DCT portion output data.

15. An encoder apparatus according to claim 14, wherein said restored DC value output means comprises:

a first adder for adding the output data of said first delay to said block DC calculator output data;

a second multiplexer connected between said first adder and said block DC calculator having first and second input terminals, for selectively supplying data input to said first and second input terminal to said first adder; and a switch having a first input terminal to which after the output data of said first adder is latched by one block interval, the latched data is applied, a second input terminal to which after the output data of said first adder is latched by a predeterminedly set interval of the macroblock, the latched data is applied, a third input terminal to which after the output data of said first adder is latched by one slice interval, the latched data is applied, and a fourth input terminal to which the average DC level is applied, for supplying the selected data in response to a predetermined selection signal applied to said second multiplexer.

16. An encoder apparatus according to claim 15, where in said second multiplexer selectively outputs the data input through said first input terminal when the supplied mode selection signal corresponds to intermode processing, while said second multiplexer selectively outputs the data input through said second input terminal when the supplied mode selection signal corresponds to intramode processing.

17. An encoding method for dividing video data processed according to an interlace scanning method into blocks, each of which has a predetermined magnitude, and encoding the respective divided block data, said method comprising the steps of:

(a) discriminatively arranging the block data into block data of a frame pattern and a field pattern;

(b) receiving the block data of the frame pattern and the block data of the field pattern, discrete-cosine-transforming the respective received data and quantizing the discrete-cosine-transformed data;

(c) receiving the block data of the frame pattern, the block data of the field pattern and motion compensated data, discrete-cosine-transforming the respective received data and quantizing the discrete-cosine-transformed data;

(d) accumulatively counting the number of bits of the block unit according to the respective run-length level which is generated during said steps (b) and (c);

(e) comparing the respective count results with one another so as to select a mode which generated a smallest number of the bits;

(f) delaying the first and second quantized data by a predetermined time during the mode selection according to steps (d) and (e);

(g) selectively outputting the delayed quantized data according to the selected mode;

(h) modulating by direct current (DC) differential pulse code modulation (DCPM) data corresponding to the selected mode;

(i) coding the DC DPCM data; and (j) restoring the DC DPCM data.

18. An encoding method according to claim 17, wherein said data restoring step (i) comprises the steps of:

(o) receiving the DC DCPM data and restoring the received data into a state prior to being quantized;

(p) receiving the inversely quantized data and detecting the DC value of each block data;

(q) receiving the inversely quantized data and restoring the received data into a state prior to being discrete-cosine-transformed; and (r) receiving the detected DC data and the inversely discrete-cosine-transformed data and restoring the received data into the original video data according to the selected mode.

19. An encoding method according to claim 17, wherein said step (h) comprises the steps of:

(k) dividing data corresponding to intramode processing of frame/field arrangement into a plurality of slices and differentially pulse code modulating the DC value a previous slice at the first block of each slice;

(l) dividing each of said slices into a plurality of macroblocks and differentially pulse code modulating the DC value of a previous macroblock at the first block of each macroblock;

(m) differentially pulse code modulating the DC value between the block data in each of said slices; and (n) differentially pulse coding modulating a difference value between the first block data of each slice and "128" coefficient corresponding to the average DC value of the block data when said slices are encoded and transmitted during intramode processing.

20. An encoding method according to claim 19, wherein average DC value of said block data corresponds to said "128" coefficient.

21. A decoding apparatus for decoding inversely quantized video data into a state prior to being encoded, by using an inverse quantizer for inverse-quantizing video data which is divided into blocks each of which has a predetermined magnitude and is encoded by intramode processing or intermode processing according to transmitted quantization level, and motion compensation means, the decoding apparatus comprising:

input means to which encoded data is input;

direct current (DC) detection means receiving output data of the inverse quantizer supplied through the input means, a mode selection signal representing said intramode processing or intermode processing and a block DC latch signal representing a block interval of the block data, for detecting DC values of the respective block data; and video restoring means receiving output data of an inverse discrete cosine transform (DCT) portion, which transforms inverse quantizer output data into a state prior to being discrete-cosine-transformed, DC data output from the DC detection means, motion compensation means output data, the mode selection signal and the block DC selection signal, for outputting an original video signal of which the DC level is restored.

22. A decoding apparatus according to claim 21, wherein said motion compensation means discriminatively arranges the motion compensated data as a frame/field pattern, supplies the discriminatively arranged frame/field pattern motion compensated data to means for adding and said data restoring means.

23. A decoding apparatus according to claim 21, wherein said DC detection means comprises:

selection means for supplying the block data supplied from said inverse quantizer to said inverse DCT portion when the mode selection signal represents said intermode processing, while supplying a value of zero t said inverse DCT portion during said intramode processing; and latch means for receiving the block DC latch signal and latching the DC value of the block data output from said inverse quantizer.

24. A decoding apparatus according to claim 21, wherein said video restoring means comprises:

a block delay for delaying the mode selection signal by one block interval;

means for delaying the motion compensated data which is arranged in a frame/field pattern so as to temporally synchronize the block data output from said inverse DCT portion;

a block DC calculator receiving the delayed frame/field arranged motion compensated data for calculating an average DC value for each block data;

means receiving the DC value output from said DC detector and the output data of said block DC calculator for outputting the restored DC value of each block data; and adder means for selectively adding one of the motion compensator output data and the restored DC value to the inverse DCT portion output data according to the mode selection signal.

25. A decoding apparatus according to claim 24, further comprising:

a first delay portion for delaying output from said DC detector by a predetermined time so as to temporally synchronize the block data output from said inverse DCT portion.

26. A decoding apparatus according to claim 24, wherein said adder means further comprises:

a second switch having a first input terminal receiving the motion compensated block data from said motion compensator and a second input terminal receiving the DC value output from said restored DC value output means for selectively outputting the data input through said first and second input terminals according to the mode selection signal; and a second adder for adding the output data of said inverse DCT portion to the output data of said second switch.

27. A decoding apparatus according to claim 24, further comprising a multiplexer connected to an input terminal of said block DC calculator for selectively outputting the delayed frame/field arranged motion compensated data according to the delayed mode selection signal supplied from said block delay.

28. A decoding apparatus according to claim 27, wherein said first multiplexer comprises means for delaying the frame/field arranged motion compensated data by a predetermined time so as to temporally synchronize the block data output from said inverse DCT portion.

29. A decoding apparatus according to claim 24, wherein said restored DC value output means comprises:

a first adder for adding the output data of said first delay to the output data of said block DC calculator;

a second multiplexer connected between said first adder and said block DC calculator and having first and second input terminal to said first adder; and a switch having a first input terminal to which, after the output data of said first adder is latched by one block interval, the latched data is applied, a second input terminal to which, after the output data of said first adder is latched by a predeterminedly set interval of the macroblock, the latched data is applied, a third input terminal to which, after the output data of said first adder is latched by one slice interval, the latched data is applied, and a fourth input terminal to which the average DC level is applied, for supplying the selected data in response to a predetermined selection signal to said second multiplexer.

30. A decoding apparatus according to claim 29, wherein said second multiplexer selectively outputs the data input through said first input terminal when the supplied mode selection signal is an intermode, while said second multiplexer selectively outputs the data input through said second input terminal when the supplied mode selection signal is an intramode.

31. A decoding apparatus according to claim 24, wherein said adder means adds the block data output from said inverse DCT portion to the motion compensated block data output from said motion compensator and outputs the added results when the supplied mode selection signal corresponds to processing, while said adder means adds the block data output from said inverse DCT portion to the restored DC value output from said restored DC value output means and outputs the added result when the supplied mode selection signal corresponds to said intramode processing.

32. A decoding apparatus according to claim 31, wherein said adder means further comprises:

a second switch having a first input terminal receiving the motion compensated block data from said motion compensator, and a second input terminal receiving the DC value output from said restored DC value output means for selectively outputting the data input through said first and second input terminals according to the mode selection signal; and a second adder for adding the output data of said inverse DCT portion to the output data of said second switch.

33. A decoding method for receiving encoded video data and decoding the received encoded video data into an original signal prior to being encoded, the decoding method comprising the steps of:

(a) detecting direct current values of respective block data from the received video data (b) motion-compensating restored block data in correspondence to a motion vector which is calculated from a motion compensator in an encoding apparatus;

(c) discriminatively arranging the motion compensated data into frame and field patterns; and (d) receiving the DC data and the motion compensated frame/field patterned data and restoring and outputting an original video signal of which the DC level is restored.

* * * * *